United States Patent
Wang et al.

(10) Patent No.: US 11,503,660 B2
(45) Date of Patent: Nov. 15, 2022

(54) LOAD BALANCING INTER-FREQUENCY MEASUREMENT ACTIVITIES FOR DUAL NETWORK LINK SCENARIOS

(71) Applicant: QUALCOMM Incorporated, San Diego, CA (US)

(72) Inventors: Yuanbo Wang, San Diego, CA (US); Yue Hong, San Diego, CA (US); Arvind Vardarajan Santhanam, San Diego, CA (US); Thawatt Gopal, San Diego, CA (US); Xiaoning Lu, San Diego, CA (US); Defang Chen, San Diego, CA (US); Viswanath Sankaran, San Diego, CA (US); Xiao Cheng, San Diego, CA (US); Christopher James Pais, San Diego, CA (US); Harsimransingh Narindersingh Bindra, San Diego, CA (US); Parth AshwinKumar Pandya, Erie, CO (US); Billy Andika, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/247,566

(22) Filed: Dec. 16, 2020

(65) Prior Publication Data
US 2022/0191959 A1 Jun. 16, 2022

(51) Int. Cl.
*H04W 76/16* (2018.01)
*H04W 76/28* (2018.01)
*H04W 24/10* (2009.01)

(52) U.S. Cl.
CPC .......... *H04W 76/16* (2018.02); *H04W 24/10* (2013.01); *H04W 76/28* (2018.02)

(58) Field of Classification Search
CPC ...... H04W 76/16; H04W 76/28; H04W 24/10
(Continued)

(56) References Cited

U.S. PATENT DOCUMENTS 9,408,103 B2 * 8/2016 Bai .................. H04W 24/10
10,291,310 B1 * 5/2019 Gopal .............. H04B 7/0817
(Continued)

OTHER PUBLICATIONS

Sharma et.al, "Performance Analysis and Adaptive DRX Scheme for Dual Connectivity", IEE Internet of Things journal, vol. 6, Dec. 2019; 16 pages.*

*Primary Examiner* — Mong-Thuy T Tran
(74) *Attorney, Agent, or Firm* — Harrity & Harrity LLP/Qualcomm Incorporated

(57) ABSTRACT

In a dual network link scenario, a wireless network may provide a user equipment (UE) with a measurement configuration indicating multiple inter-frequency measurement objects during an off duration of a discontinuous reception (DRX) cycle configured on a first network link. The UE may assign the inter-frequency measurement objects to a second network link if the second network link has an always-on configuration. Alternatively, if the second network link has a DRX configuration, the UE may perform some inter-frequency measurement activities on the first network link and assign some inter-frequency measurement objects to unoccupied gap occasions in the off duration for the DRX cycle configured on the second network link. In this way, the UE may save power by spending more time in a low power state, and mobility performance for the UE may be improved by increasing the efficiency and reliability of inter-frequency measurement activities.

29 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,420,028 B2 * | 9/2019 | Rahman | H04W 76/15 |
| 10,798,600 B2 * | 10/2020 | Thangarasa | H04W 24/10 |
| 2015/0358094 A1 * | 12/2015 | Yi | H04W 48/10 |
| | | | 370/252 |
| 2016/0081020 A1 * | 3/2016 | Rahman | H04W 24/10 |
| | | | 370/311 |
| 2017/0026948 A1 * | 1/2017 | Yang | H04W 36/30 |
| 2017/0135125 A1 * | 5/2017 | Buthler | H04L 1/1887 |
| 2017/0208619 A1 * | 7/2017 | Yang | H04W 72/1284 |
| 2017/0303151 A1 * | 10/2017 | Lunden | H04W 52/0212 |
| 2020/0313833 A1 * | 10/2020 | Yi | H04L 5/001 |
| 2021/0227409 A1 * | 7/2021 | Siomina | H04W 72/046 |

* cited by examiner

LOAD BALANCING INTER-FREQUENCY MEASUREMENT ACTIVITIES FOR DUAL NETWORK LINK SCENARIOS

FIELD OF THE DISCLOSURE

Aspects of the present disclosure generally relate to wireless communication and to techniques and apparatuses for load balancing inter-frequency measurement activities for dual network link scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some cases, a user equipment (UE) may be configured to communicate on one or more wireless networks using different network links. For example, a UE may be configured to communicate with one or more cells in a master cell group using a first network link and with one or more cells in a secondary cell group using a second network link in a dual connectivity scenario. Additionally, or alternatively, a UE may be configured to communicate with one or more cells associated with a first subscriber identity module (SIM) using a first network link and with one or more cells associated with a second SIM using a second network link in a multi-SIM scenario. In some cases, the first network link and the second network link may be configured independently. For example, one or more network links may be associated with a discontinuous reception (DRX) configuration that causes the UE to cycle between an on duration in which the UE monitors or otherwise receives downlink signals and an off duration in which the UE may operate one or more reception components in a low power (e.g., sleep) state. Additionally, or alternatively, the UE may perform one or more other radio-related activities during the off duration of the DRX cycle, such as monitoring one or more frequencies, retuning, performing a search process, and/or performing an implementation-specific activity, among other examples.

However, a wireless network may provide the UE with a measurement configuration indicating one or more inter-frequency measurement objects on a network link that are scheduled during the off duration of a DRX cycle configured on the network link. In such cases, when a measurement configuration indicates one or more inter-frequency measurement objects that are scheduled on a network link during the off duration of a DRX cycle configured on the network link, the measurement configuration may reduce the potential power savings that the UE may achieve during the off duration of the DRX cycle. For example, the UE has to utilize one or more gap occasions during the off duration of the DRX cycle in order to perform the configured inter-frequency measurement activities, which reduces a proportion of the off duration of the DRX cycle during which the UE can operate in the low power state. Furthermore, because the first network link and the second network link may be configured independently in a dual network link scenario (e.g., a dual connectivity and/or multi-SIM scenario), the second network link may have one or more unoccupied gap occasions available to perform measurement activities, which could potentially be wasted in cases where there are no or very few measurement objects configured on the second network link.

Some aspects described herein relate to techniques and apparatuses to load balance inter-frequency measurement activities for dual network link scenarios. For example, when a wireless network provides a UE with a measurement configuration indicating multiple inter-frequency measurement objects that are scheduled during an off duration of a DRX cycle configured on a first network link and the UE has one or more unoccupied gap occasions on a second network link, the UE may assign a subset of the inter-frequency measurement objects to the unoccupied gap occasions on the second network link. For example, the UE may assign all of the inter-frequency measurement objects to the second network link if the second network link has an always-on configuration. In this way, the UE may perform inter-frequency measurement activities using the unoccupied gap occasions that would otherwise be wasted on the second network link, and may operate one or more components associated with the first network link in accordance with the off duration of the DRX cycle (e.g., by operating in a sleep state, monitoring one or more frequencies, retuning, performing a search process, and/or performing an implementation-specific activity) during the entire off duration of the DRX cycle configured on the first network link. Alternatively, if the second network link has a DRX configuration, the UE may assign some inter-frequency measurement objects to unoccupied gap occasions in an earlier portion of the off duration for the DRX cycle configured on the second network link. In this way, the UE may perform inter-frequency measurement activities on the first network link and the second network link at the same time (e.g., during overlapping portions of the DRX off durations configured on the first and second network links) to extend a common sleep duration across the first and second network links. As a result, the UE may operate one or more components associated with the first network link, one or more components associated with the second network link, and one or more common components shared by the first network link and the second network link in a sleep state during the common sleep duration. In this way, the UE may save power by spending more time in a low power state, and mobility performance for the UE may be improved by increasing the efficiency and reliability of inter-frequency measurement activities.

In some aspects, a method of wireless communication performed by a UE includes receiving, from a base station, a measurement configuration indicating multiple inter-frequency measurement objects on a first network link associated with a DRX cycle; assigning, to a second network link, one or more inter-frequency measurement objects, among the multiple inter-frequency measurement objects, that are scheduled during an off duration of the DRX cycle; and operating one or more components associated with the first network link in accordance with the off duration of the DRX cycle during a portion of the off duration of the DRX cycle in which the one or more inter-frequency measurement objects are scheduled.

In some aspects, a UE for wireless communication includes a memory and one or more processors operatively coupled to the memory, the memory and the one or more processors configured to: receive, from a base station, a measurement configuration indicating multiple inter-frequency measurement objects on a first network link associated with a DRX cycle; assign, to a second network link, one or more inter-frequency measurement objects, among the multiple inter-frequency measurement objects, that are scheduled during an off duration of the DRX cycle; and operate one or more components associated with the first network link in accordance with the off duration of the DRX cycle during a portion of the off duration of the DRX cycle in which the one or more inter-frequency measurement objects are scheduled.

In some aspects, a non-transitory computer-readable medium storing a set of instructions for wireless communication includes one or more instructions that, when executed by one or more processors of a UE, cause the UE to: receive, from a base station, a measurement configuration indicating multiple inter-frequency measurement objects on a first network link associated with a DRX cycle; assign, to a second network link, one or more inter-frequency measurement objects, among the multiple inter-frequency measurement objects, that are scheduled during an off duration of the DRX cycle; and operate one or more components associated with the first network link in accordance with the off duration of the DRX cycle during a portion of the off duration of the DRX cycle in which the one or more inter-frequency measurement objects are scheduled.

In some aspects, an apparatus for wireless communication includes means for receiving, from a base station, a measurement configuration indicating multiple inter-frequency measurement objects on a first network link associated with a DRX cycle; means for assigning, to a second network link, one or more inter-frequency measurement objects, among the multiple inter-frequency measurement objects, that are scheduled during an off duration of the DRX cycle; and means for operating one or more components associated with the first network link in accordance with the off duration of the DRX cycle during a portion of the off duration of the DRX cycle in which the one or more inter-frequency measurement objects are scheduled.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
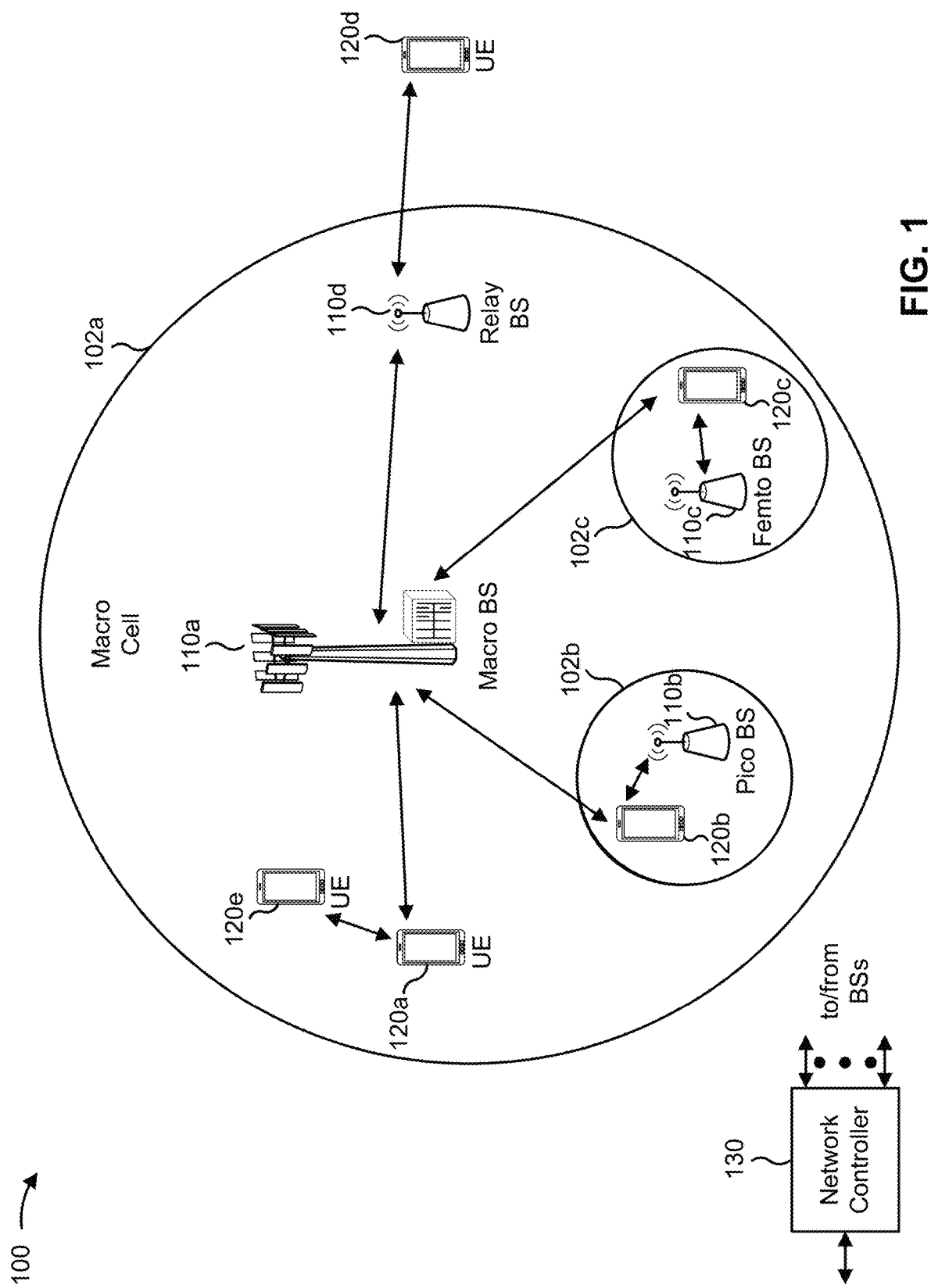
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, one or more UEs 120 in wireless network 100 may be configured to communicate using multiple network links (e.g., in a dual and/or multi-network link scenario). For example, in a dual connectivity scenario, a UE 120 may be configured communicate with one or more cells in a master cell group using a first network link and may be further configured to communicate with one or more cells in a secondary cell group using a second network link. Additionally, or alternatively, in a multi-SIM scenario, a UE may be configured to communicate with one or more cells associated with a first subscriber identity module (SIM) using a first network link and with one or more cells associated with a second SIM using a second network link. In some aspects, the multiple network links may be configured independently from one another. For example, in some aspects, one or more network links that a UE 120 uses to communicate in wireless network 100 may be associated with a discontinuous reception (DRX) configuration in which the UE 120 cycles between an on duration (e.g., an active state during which the UE monitors or otherwise receives downlink signals) and an off duration (e.g., an inactive or sleep state during which the UE may operate one or more reception components in a low power state or perform other radio-related activities while there are limited monitoring obligations during the DRX off duration).

In some aspects, a UE 120 that communicates using multiple network links (e.g., in a dual connectivity and/or multi-SIM scenario) may be configured to perform inter-frequency measurement activities and report measurement results to a base station 110 (e.g., to improve mobility performance). However, in some cases, the inter-frequency measurement activities may be scheduled on a particular network link during the off duration of a DRX cycle associated with the network link. In this case, the UE 120 may be unable to operate reception components associated with the network link in the low power state and thereby realize the power saving benefits of the off duration of the DRX cycle because the UE 120 may need to open one or more gaps on the network link to perform the configured inter-frequency measurement activities. Accordingly, to reduce power consumption and/or improve mobility, a UE 120 may load balance inter-frequency measurement activities in a dual network link scenario where one or more inter-frequency measurement objects are configured on a first network link during the off duration of a DRX cycle and one or more unoccupied gap occasions are available on a second network link. For example, the UE 120 may assign all the inter-frequency measurement objects to the second network link if the second network link has an always-on configuration. Alternatively, if the second network link has a DRX configuration, the UE 120 may perform some inter-frequency measurement activities on the first network link and assign some inter-frequency measurement objects to unoccupied gap occasions in the off duration for the DRX cycle configured on the second network link.

In this way, the UE 120 may extend the time that reception components associated with at least the first network link spend in the low power state. Furthermore, distributing inter-frequency measurement activities among the first network link and the second network link may extend a common sleep duration across the first network link and the second network link, which may increase the time that the UE 120 can operate all reception components in a low power state (including components associated with the first network link, components associated with the second network link, and common components shared by the first network link and the second network link).

As indicated above, FIG. 1 is provided as an example. Other examples may differ from what is described with regard to FIG. 1.

Figure 2:
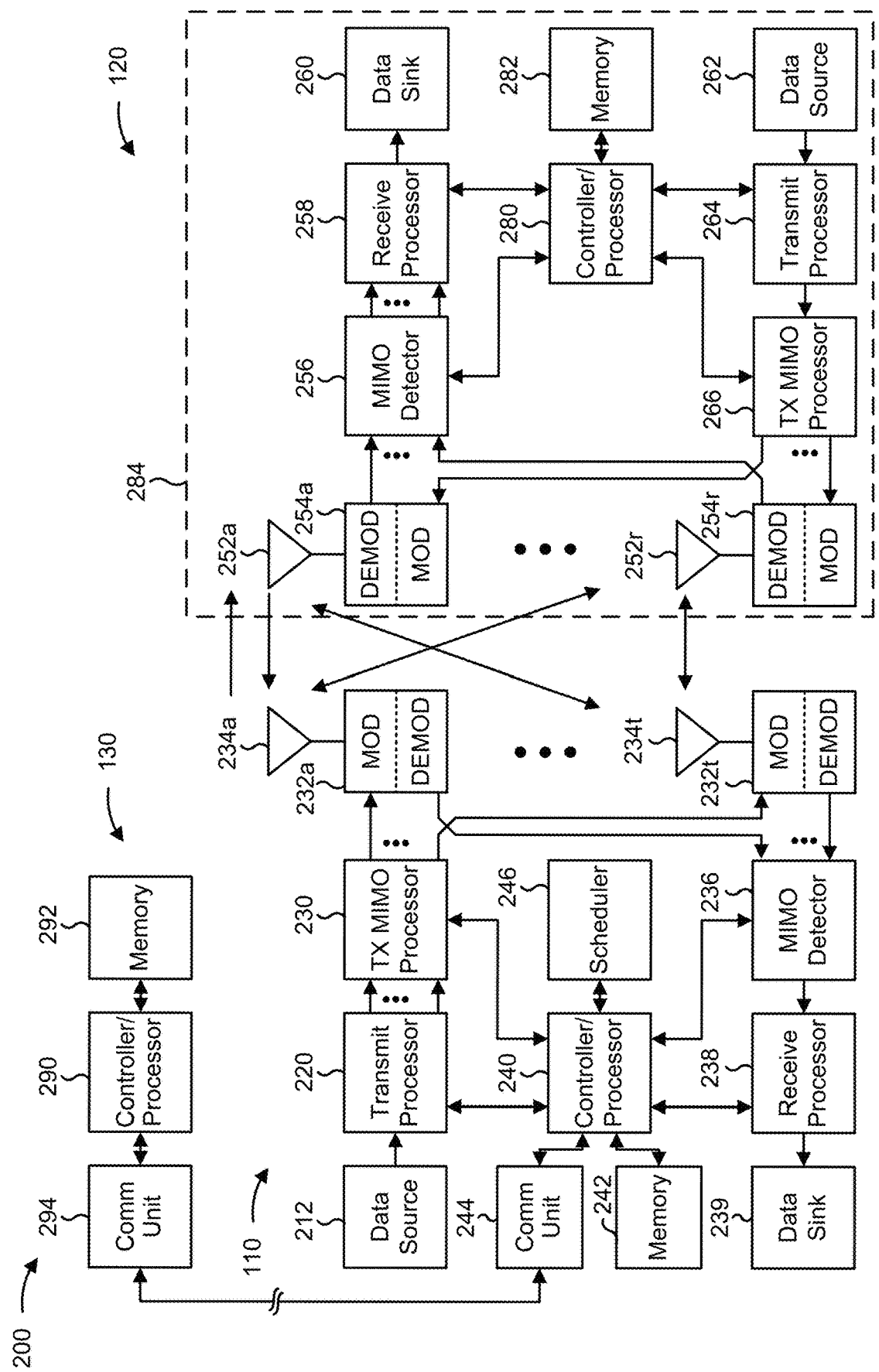
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with load balancing inter-frequency measurement activities for dual network link scenarios, as described in more detail elsewhere herein. For example, controller/processor 240 of base station 110, controller/processor 280 of UE 120, and/or any other component(s) of FIG. 2 may perform or direct operations of, for example, method 800 of FIG. 8 and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 800 of FIG. 8 and/or other processes as described herein. In some aspects, executing instructions may include running the instructions, converting the instructions, compiling the instructions, and/or interpreting the instructions, among other examples.

In some aspects, the UE 120 includes means for receiving, from a base station, a measurement configuration indicating multiple inter-frequency measurement objects on a first network link associated with a DRX cycle; means for assigning, to a second network link, one or more inter-frequency measurement objects, among the multiple inter-frequency measurement objects, that are scheduled during an off duration of the DRX cycle; and/or means for operating one or more components associated with the first network link in accordance with the off duration of the DRX cycle during a portion of the off duration of the DRX cycle in which the one or more inter-frequency measurement objects are scheduled. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for operating one or more common components that are shared by the first network link and the second network link in accordance with the off duration of the DRX cycle during the portion of the off duration of the DRX cycle associated with the first network link that overlaps with the off duration of the DRX cycle associated with the second network link.

In some aspects, the UE 120 includes means for performing, using one or more components associated with the second network link, one or more inter-frequency measurement activities for the one or more inter-frequency measurement objects assigned to the second network link; and/or means for transmitting, to the base station via the first network link, a measurement report including one or more inter-frequency measurements that are based at least in part on the one or more inter-frequency measurement activities performed using the one or more components associated with the second network link.

As indicated above, FIG. 2 is provided as an example. Other examples may differ from what is described with regard to FIG. 2.

Figure 3:
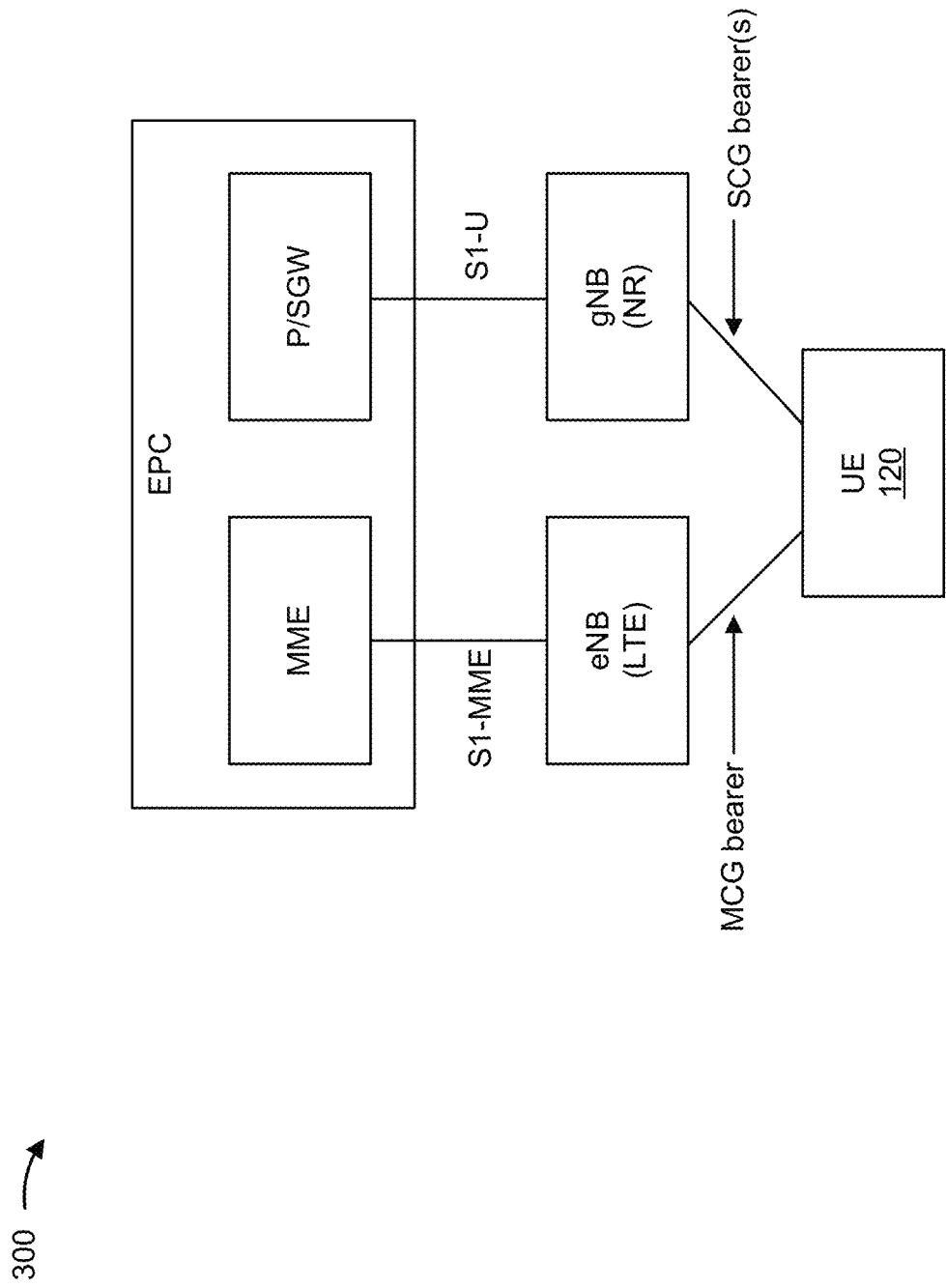
FIG. 3 is a diagram illustrating an example of dual connectivity.

FIG. 3 is a diagram illustrating an example 300 of dual connectivity, in accordance with various aspects of the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to any suitable dual connectivity mode. For example, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, a dual connectivity mode may refer to an ENDC mode, a NEDC mode, an NRDC mode, and/or another type of dual connectivity mode in which the UE 120 is configured to communicate on a first network link and a second network link that are associated with different cell groups (e.g., an MCG and an SCG).

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, a wireless network that enables operation in a 5G NSA mode may enable such operations using an MCG for a first RAT (e.g., an LTE RAT and/or a 4G RAT) and an SCG for a second RAT (e.g., an NR RAT and/or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band). In some aspects, the MCG and/or the SCG may be associated with a DRX configuration.

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information, measurement configurations, and/or measurement reports) using one or more SRBs. In some aspects, a radio bearer may be dedicated to a specific cell group (e.g., a radio bearer may be an MCG bearer and/or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
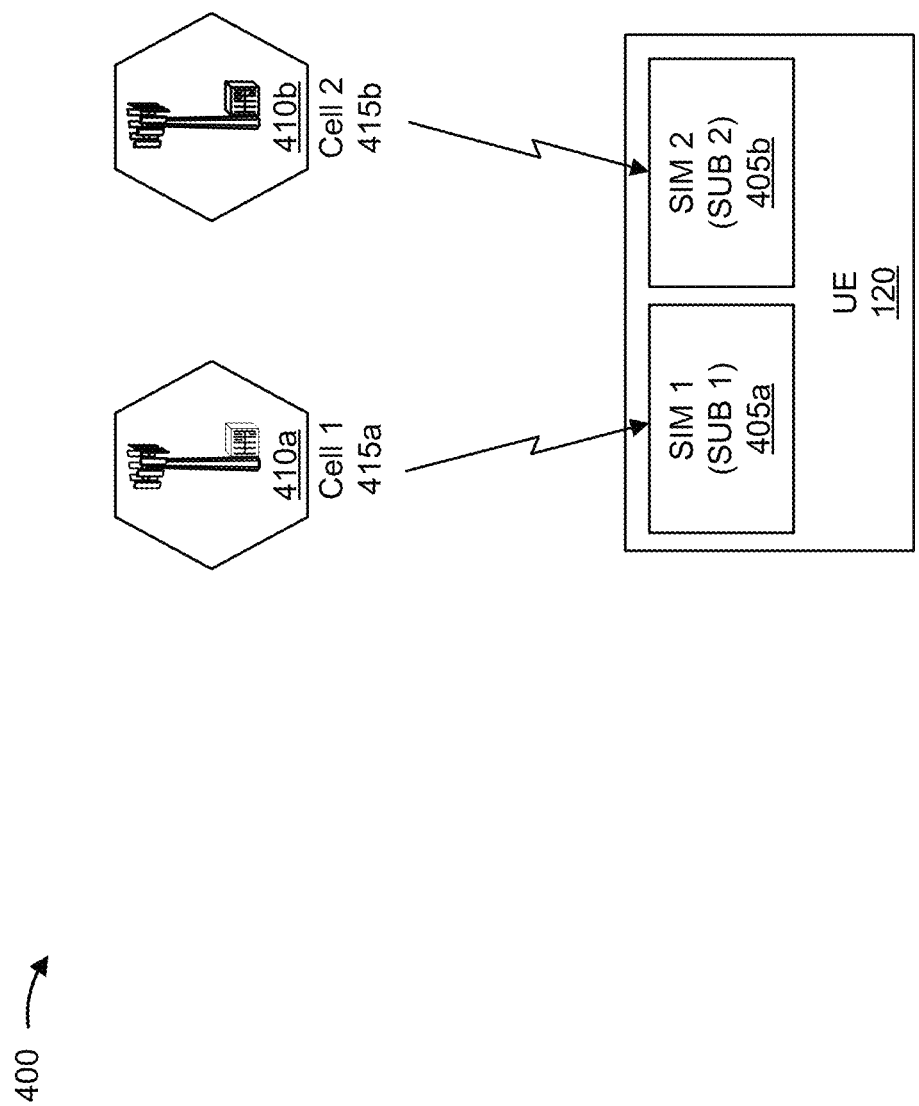
FIG. 4 is a diagram illustrating an example of a multi-subscriber identity module UE.

FIG. 4 is a diagram illustrating an example 400 of a multiple subscriber identity module (SIM) UE, in accordance with various aspects of the present disclosure. As shown in FIG. 4, a UE 120 may be a multiple SIM (multi-SIM) UE that includes multiple SIMS (two or more SIMs), shown as a first SIM 405*a* and a second SIM 405*b*. The first SIM 405*a* may be associated with a first subscription (shown as SUB 1), and the second SIM 405*b* may be associated with a second subscription (shown as SUB 2). A subscription may include a subscription with a network operator (e.g., a mobile network operator (MNO)) that enables the UE 120 to access a wireless network (e.g., a radio access network (RAN)) associated with the network operator.

A SIM 405 may be a removable SIM (for example, a SIM card) or an embedded SIM. A SIM 405 may include an integrated circuit that securely stores an international mobile subscriber identity (IMSI) and a security key, which are used to identify and authenticate a corresponding subscription associated with the SIM 405. In some cases, a SIM 405 may store a list of services that the UE 120 has permission to access using a subscription associated with the SIM 405, such as a data service or a voice service, among other examples.

As further shown in FIG. 4, the UE 120 may communicate (e.g., in a connected mode, an idle mode, or an inactive mode) with a first base station 410*a* via a first cell 415*a* (shown as Cell 1) using the first SIM 405*a*. In this case, the first subscription of the UE 120 may be used to access the first cell 415*a* (e.g., using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (e.g., in a connected mode, an idle mode, or an inactive mode) with a second base station 410*b* via a second cell 415*b* (shown as Cell 2) using the second SIM 405*b*. In this case, the second subscription of the UE 120 may be used to access the second cell 415*b* (e.g., using a second IMSI for UE identification, using a second security key for UE authentication, using a second list of services that the UE 120 is permitted to access using the second subscription, or by counting data or voice usage on the second cell against the second subscription, among other examples).

The first base station 410*a* and/or the second base station 410*b* may include one or more of the base stations 110 described above in connection with FIG. 1. Although the first cell 415*a* and the second cell 415*b* are shown as being provided by different base stations, in some aspects, the first cell 415 and the second cell 415*b* may be provided by the same base station. Thus, in some aspects, the first base station 410*a* and the second base station 410*b* may be integrated into a single base station.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network links at the same time, among other examples. In general, the multiple network links associated with the multiple SIMs 405 may be configured or otherwise managed independently. For example, one or more of the multiple SIMs 405 may be used to communicate on a network link associated with a discontinuous reception (DRX) configuration. However, an SR-DSDS UE or an SR-MSMS UE may only be capable of receiving data on one network link at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, and/or a single receive chain shared by the multiple subscriptions, among other examples.

As indicated above, FIG. 4 is provided as an example. Other examples may differ from what is described with regard to FIG. 4.

Figure 5:
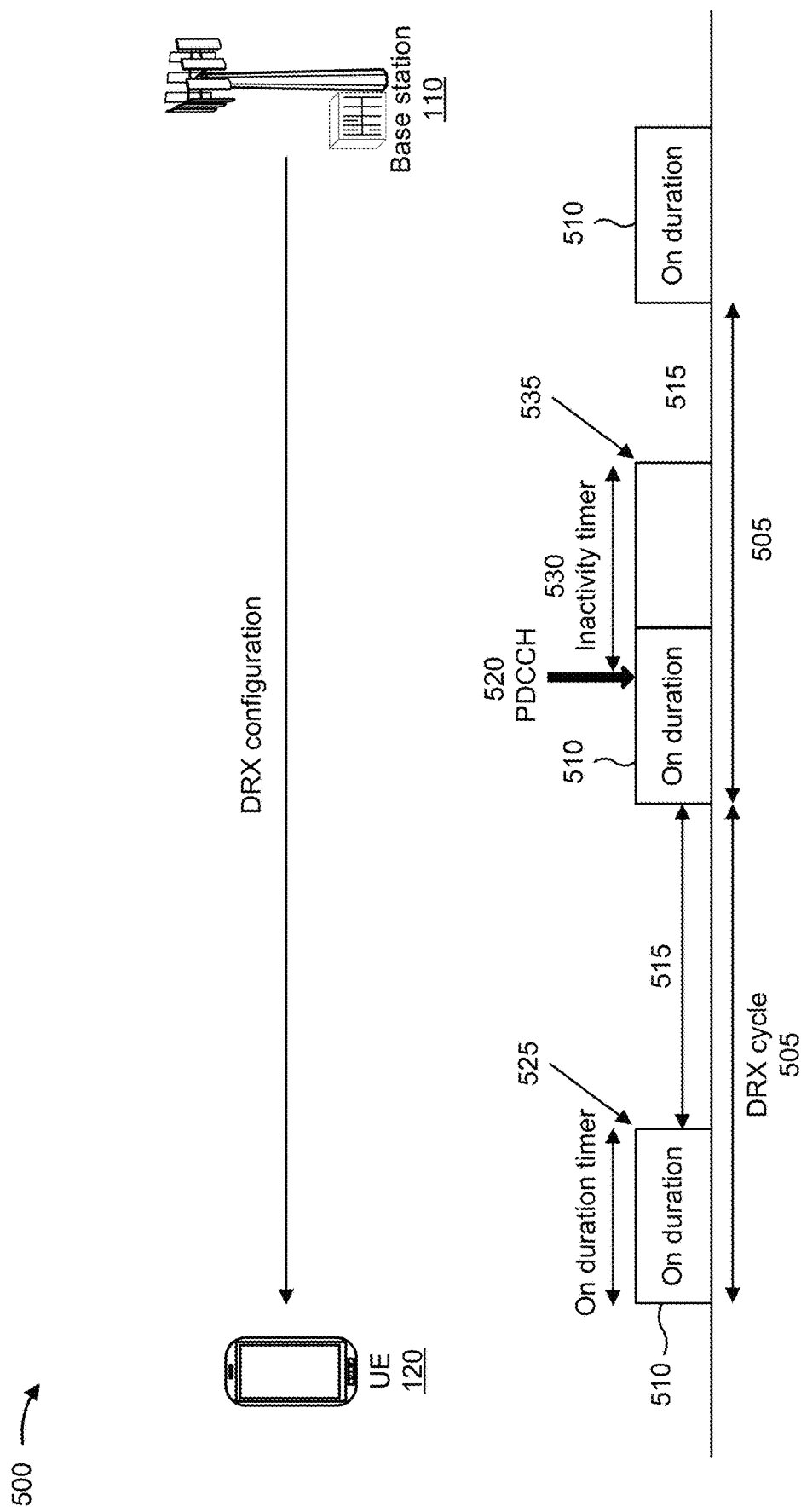
FIG. 5 is a diagram illustrating an example of a discontinuous reception configuration.

FIG. 5 is a diagram illustrating an example 500 of a discontinuous reception (DRX) configuration, in accordance with various aspects of the present disclosure.

As shown in FIG. 5, a base station 110 may transmit a DRX configuration to a UE 120 to configure a DRX cycle 505 for the UE 120. A DRX cycle 505 may include a DRX on duration 510 (e.g., during which a UE 120 is awake or in an active state) and an opportunity to enter a sleep state or another suitable low power mode or perform other radio-related activities (e.g., monitoring one or more frequencies, retuning, performing a search process, and/or performing an implementation-specific activity) during an off duration 515 of the DRX cycle 505, which may be referred to herein as DRX off duration 515. As used herein, the time during which the UE 120 is configured to be in an active state during the DRX on duration 510 may be referred to as an active time, and the time during which the UE 120 is configured to be in the sleep state during the DRX off duration 515 may be referred to as an inactive time. As described below, the UE 120 may monitor a physical downlink control channel (PDCCH) on a network link associated with the DRX configuration during the active time, and may refrain from monitoring the PDCCH on the network link associated with the DRX configuration during the inactive time.

During the DRX on duration 510 (e.g., the active time), the UE 120 may monitor a downlink control channel (e.g., a PDCCH), as shown at 520. For example, the UE 120 may monitor the PDCCH for downlink control information (DCI) pertaining to the UE 120. If the UE 120 does not detect and/or is unable to successfully decode any PDCCH communications intended for the UE 120 during the DRX on duration 510, then the UE 120 may enter the sleep state during the DRX off duration 515 (e.g., for the inactive time) at the end of the DRX on duration 510, as shown at 525. In this way, the UE 120 may conserve battery power and/or reduce power consumption. As shown, the DRX cycle 505 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 530 (e.g., which may extend the active time). The UE 120 may start the DRX inactivity timer 530 at a time at which the PDCCH communication is received (e.g., in a transmission time interval (TTI) in which the PDCCH communication is received, such as a slot, a subframe, and/or the like). The UE 120 may remain in the active state until the DRX inactivity timer 530 expires, at which time the UE 120 may enter the sleep state during the DRX off duration 515 (e.g., for the inactive time), as shown at 535. During the duration of the DRX inactivity timer 530, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, and/or the like. The UE 120 may restart the DRX inactivity timer 530 after each detection of a PDCCH communication for the UE 120 for an initial transmission (e.g., but not for a retransmission). By operating in this manner, the UE 120 may conserve battery power and/or reduce power consumption by entering the sleep state during the off duration 515 of the DRX cycle 505.

As indicated above, FIG. 5 is provided as an example. Other examples may differ from what is described with respect to FIG. 5.

In some cases, a UE may be configured to communicate on one or more wireless networks using different network links. For example, as described above with reference to FIG. 3, a UE may be configured to communicate with one or more cells in an MCG using a first network link and with one or more cells in an SCG using a second network link in a dual connectivity scenario. Additionally, or alternatively, as described above with reference to FIG. 4, a UE may be configured to communicate with one or more cells associated with a first SIM using a first network link and with one or more cells associated with a second SIM using a second network link in a multi-SIM scenario. In some cases, the first network link and the second network link may be configured independently. For example, as described above with reference to FIG. 5, one or more network links may be associated with a DRX configuration that causes the UE to cycle between an on duration in which the UE monitors or otherwise receives downlink signals and an off duration in which the UE may operate one or more reception components in a sleep state or perform other radio-related activities to take advantage of the limited monitoring obligations during the off duration of the DRX configuration.

However, in some cases, a wireless network may provide the UE with a measurement configuration indicating one or more inter-frequency measurement objects that are scheduled on a network link during the off duration of a DRX cycle configured on the network link. In such cases, the measurement configuration may reduce the potential power savings that the UE may achieve during the off duration of the DRX cycle. For example, the UE may need to utilize one or more gap occasions during the off duration of the DRX cycle to perform the inter-frequency measurement activities configured on the corresponding network link, which reduces a proportion of the DRX off duration during which the UE can operate in the sleep state. Furthermore, because the first network link and the second network may be configured independently in a dual network link scenario (e.g., a dual connectivity and/or multi-SIM scenario), the second network link may have one or more unoccupied gap occasions available to perform measurement activities, which could potentially be wasted in cases where there are no or very few measurement objects configured on the second network link.

Some aspects described herein relate to techniques and apparatuses to load balance inter-frequency measurement activities for dual network link scenarios. For example, when a wireless network provides a UE with a measurement configuration indicating multiple inter-frequency measurement objects that are scheduled during a DRX off duration configured on a first network link and the UE has one or more unoccupied gap occasions on a second network link, the UE may assign a subset of the inter-frequency measurement objects to the unoccupied gap occasions on the second network link.

For example, the UE may assign all of the inter-frequency measurement objects to the second network link if the second network link has an always-on configuration. In this way, the UE may perform inter-frequency measurement activities using the unoccupied gap occasions that would otherwise be wasted on the second network link, and may operate one or more components associated with the first network link in a sleep state during the entire off duration of the DRX cycle configured on the first network link. Alternatively, if the second network link has a DRX configuration, the UE may assign some inter-frequency measurement objects to unoccupied gap occasions in an earlier portion of the off duration for the DRX cycle configured on the second network link.

In this way, the UE may perform inter-frequency measurement activities on the first network link and the second network link at the same time (e.g., during overlapping portions of the DRX off durations configured on the first and second network links) to extend a common sleep duration across the first and second network links. As a result, the UE may operate one or more components associated with the first network link, one or more components associated with the second network link, and one or more common components shared by the first network link and the second network link in a sleep state during the common sleep duration. In this way, the UE may save power by spending more time in a low power state, and mobility performance for the UE may be improved by increasing the efficiency and reliability of inter-frequency measurement activities.

Figure 6A:
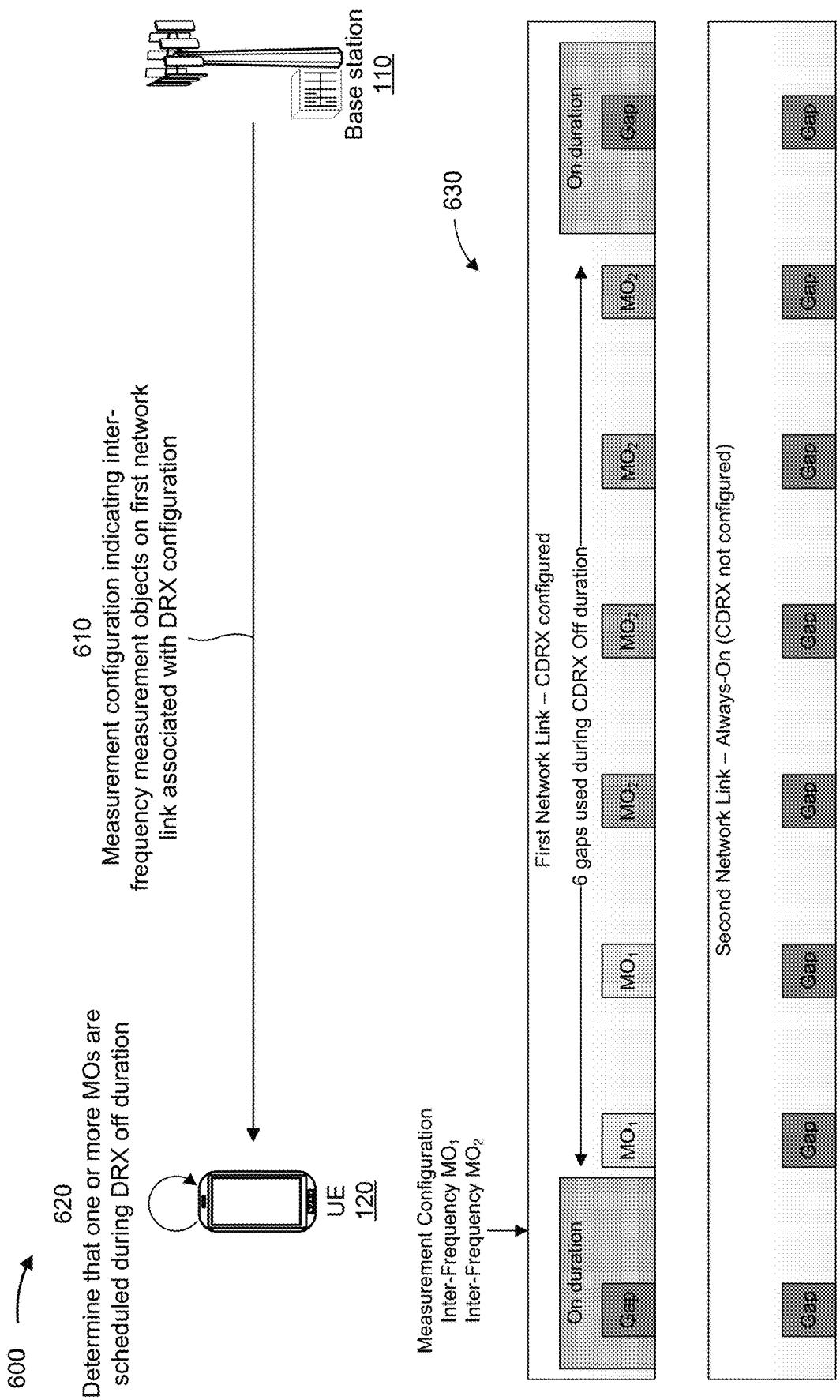
FIGS. 6A-6B are diagrams illustrating an example associated with load balancing inter-frequency measurement activities for a dual network link scenario.
Figure 6B:
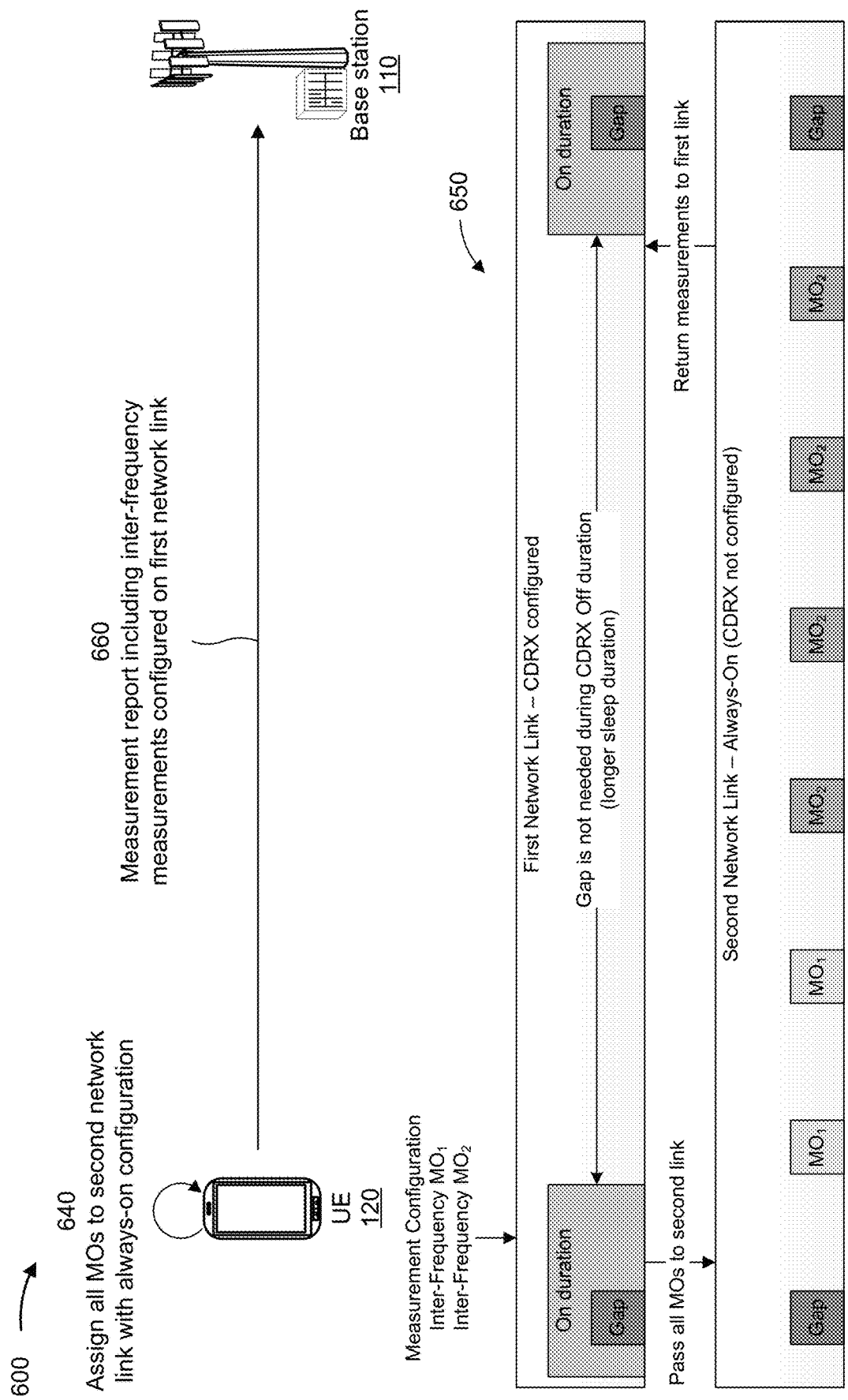

FIGS. 6A-6B are diagrams illustrating an example 600 associated with load balancing inter-frequency measurement activities for a dual network link scenario. As shown in FIGS. 6A-6B, example 600 includes communication between a base station 110 and a UE 120 in a wireless network, such as wireless network 100.

In some aspects, the UE 120 may communicate with the base station 110 via a first network link, which may include a wireless access link associated with an uplink and a downlink. Furthermore, the UE 120 may be configured to communicate with the base station 110 or another base station (not shown) via a second network link. For example, the UE 120 may be configured to communicate via the first network link and the second network link in a dual connectivity mode in which the first network link and the second network link are associated with different cell groups (e.g., as described above with reference to FIG. 3). Additionally, or alternatively, the UE 120 may be configured to communicate via the first network link using a first subscription associated with a first SIM and via the second network link using a second subscription associated with a second SIM in a multi-SIM mode (e.g., as described above with reference to FIG. 4).

In some aspects, the first network link and the second network link that are configured for the UE 120 may be managed independently from one another. For example, in the example 600 shown in FIGS. 6A-6B, the first network link is associated with a DRX configuration (e.g., a connected mode DRX (CDRX) configuration allowing the UE 120 to make signaling-free transitions between an active state during a DRX on duration and a sleep state during a DRX off duration) and the second network link is associated with an always-on configuration. Furthermore, in some aspects, the first network link and the second network link may be associated with different measurement configurations. For example, as shown at 610, the base station 110 may transmit, and the UE 120 may receive, a measurement configuration that indicates one or more inter-frequency measurement objects on the first network link associated with the DRX configuration. As further shown in FIG. 6A, the second network link associated with the always-on configuration has no measurement objects or very few measurement objects configured. Accordingly, as described herein, the UE 120 may be configured to load balance the inter-frequency measurement objects to increase utilization of available resources on the second network link and/or increase a time period during which reception components associated with the first network link can be operated in a low power state during the off duration of the DRX cycle configured on the first network link.

For example, in some aspects, the UE 120 and the base station 110 may communicate on a downlink using one or more downlink carrier frequencies associated with one or more serving cells. Accordingly, the base station 110 may transmit the measurement configuration to the UE 120 to request that the UE 120 perform one or more measurement activities to manage the network link between the base station 110 and the UE 120 (e.g., to determine whether to maintain the network link via the current serving cell(s) or initiate a handover to a different carrier frequency or a different serving cell that may offer better performance than the current serving cell(s)). For example, as described herein, the measurement configuration may indicate the inter-frequency measurement objects to request that the UE 120 perform measurements at one or more frequencies that differ from any downlink carrier frequency that the UE 120 is using to communicate with the base station 110. Furthermore, in addition to indicating the inter-frequency measurement objects, the measurement configuration may include parameters that relate to a reporting configuration (e.g., one or more reporting criteria that trigger the UE 120 to transmit a measurement report and/or a reporting format), one or more measurement identities that each link a particular measurement object with a particular reporting configuration, one or more quantity configurations that define measurement quantities and associated event and/or reporting filtering for a measurement type, and/or one or more measurement gaps that define time periods that the UE 120 may use to perform the inter-frequency measurement activities (e.g., time periods when no downlink or uplink transmissions are scheduled to or from the UE 120).

As further shown in FIG. 6A, at 620, the UE 120 may determine that the inter-frequency measurement objects configured on the first network link include one or more inter-frequency measurement objects that are scheduled during the off duration of the DRX cycle configured on the first network link. For example, as shown at 630, the measurement configuration may indicate a first inter-frequency measurement object ($MO_1$) associated with one or more inter-frequency measurement activities that the UE 120 is requested to perform on a first downlink frequency that differs from any downlink carrier frequencies that the UE 120 is using to communicate with the base station 110, and a second inter-frequency measurement object ($MO_2$) associated with one or more inter-frequency measurement activities that the UE 120 is requested to perform on a second downlink frequency that differs from any of the downlink carrier frequencies that the UE 120 is using to communicate with the base station 110. In this case, as shown at 630, the measurement configuration may cause the UE 120 to open six (6) gap occasions during the off duration of the DRX cycle, which would prevent the UE 120 from operating reception components associated with the first network link in accordance with the off duration of the DRX cycle during the off duration of the DRX cycle if the UE 120 were to utilize the gap occasions to perform inter-frequency measurement activities. However, because the second network link has an always-on configuration and no or very few measurement objects are configured on the second network link, the second network link includes unoccupied gap occasions that the UE 120 may utilize to perform the inter-frequency measurement activities for the inter-frequency measurement objects configured on the first network link.

Accordingly, as shown in FIG. 6B, at 640, the UE 120 may assign, to the second network link, all of the inter-frequency measurement objects that are configured on the first network link during the off duration of the DRX cycle associated with the first network link. For example, as shown at 650, all of the inter-frequency measurement objects configured on the first network link may be passed or otherwise assigned to the unoccupied gap occasions on the second network link based at least in part on the second network link having an always-on configuration. Additionally, or alternatively, the UE 120 may include a common component associated with the first network link and the second network link (e.g., a controller, a receive processor, and/or a shared baseband component, among other examples) that may evaluate the measurement objects configured on the first network link and the second network link and assign or otherwise distribute the measurement objects among the first network link and the second network link to maximize power savings and/or resource utilization, among other examples. Accordingly, the UE 120 may include one or more components that can control the first network link and the second network link, and the one or more components may be configured to assign or otherwise distribute the measurement objects among the first network link and the second network link. In this way, the UE 120 may utilize the first network link and/or the second network link to perform measurement activities associated with measurement objects that are configured on either link. Furthermore, because the first network link and the second network link are configured independently, the assignment or distribution of the measurement objects among the first network link and the second network link by the UE 120 may be transparent to the base station(s) 110 that configured the measurement objects.

For example, the common component of the UE 120 may assign all of the inter-frequency measurement objects to the second network link when the second network link has an always-on configuration and unoccupied gap occasions, which may reduce power consumption at the UE 120 because the UE 120 can operate reception components associated with the first network link in accordance with the off duration of the DRX cycle during the entire off duration of the DRX cycle. Moreover, using one or more reception components associated with the second network link to perform the inter-frequency measurement activities consumes little to no additional power at the UE 120 because the second network link would be in an active state even if no inter-frequency measurement activities were performed using the second network link. Furthermore, the UE 120 may assign the inter-frequency measurement objects to the second network link to improve resource utilization at the UE 120 because the unoccupied gap occasions on the second network link would otherwise be wasted if no measurement activities were performed during the gap occasions.

Accordingly, the UE 120 may use reception components associated with the second network link to perform inter-frequency measurement activities for the inter-frequency measurement objects assigned to the second network link while the reception components associated with the first network link are operated in accordance with the off duration of the DRX cycle. As shown in FIG. 6B, the resulting inter-frequency measurements may then be returned from the second network link where the inter-frequency measurements were performed to the first link where the inter-frequency measurement objects were originally configured (e.g., via an internal bus or another suitable interconnect). Accordingly, as shown at 660, the UE 120 may transmit, and the base station 110 may receive, a measurement report that includes the inter-frequency measurements that were originally configured on the first network link and performed using the second network link. For example, in some aspects, the measurement report may be triggered and/or formatted based at least in part on a reporting configuration indicated in the measurement configuration provided by the base station 110, and may include one or more measurement quantities based at least in part on one or more measurement identities and/or quantity configurations indicated in the measurement configuration provided by the base station 110. In this way, the UE 120 may use the second network link to perform the inter-frequency measurements requested by the base station in order to reduce power consumption and/or improve resource utilization associated with the inter-frequency measurement activities in a manner that is generally transparent to the base station 110.

As indicated above, FIGS. 6A-6B are provided as an example. Other examples may differ from what is described with respect to FIGS. 6A-6B.

Figure 7A:
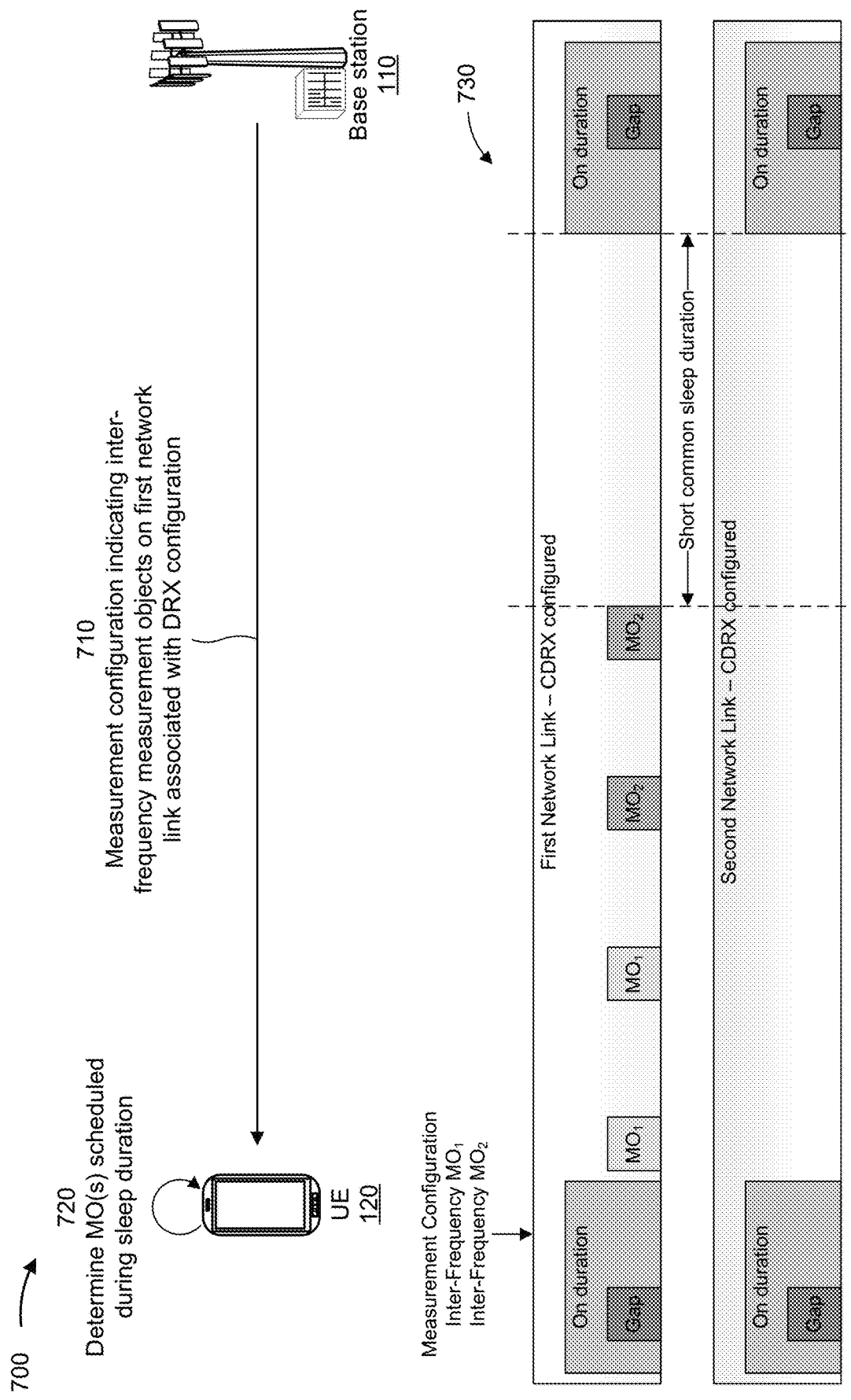
FIGS. 7A-7B are diagrams illustrating an example associated with load balancing inter-frequency measurement activities for a dual network link scenario.
Figure 7B:
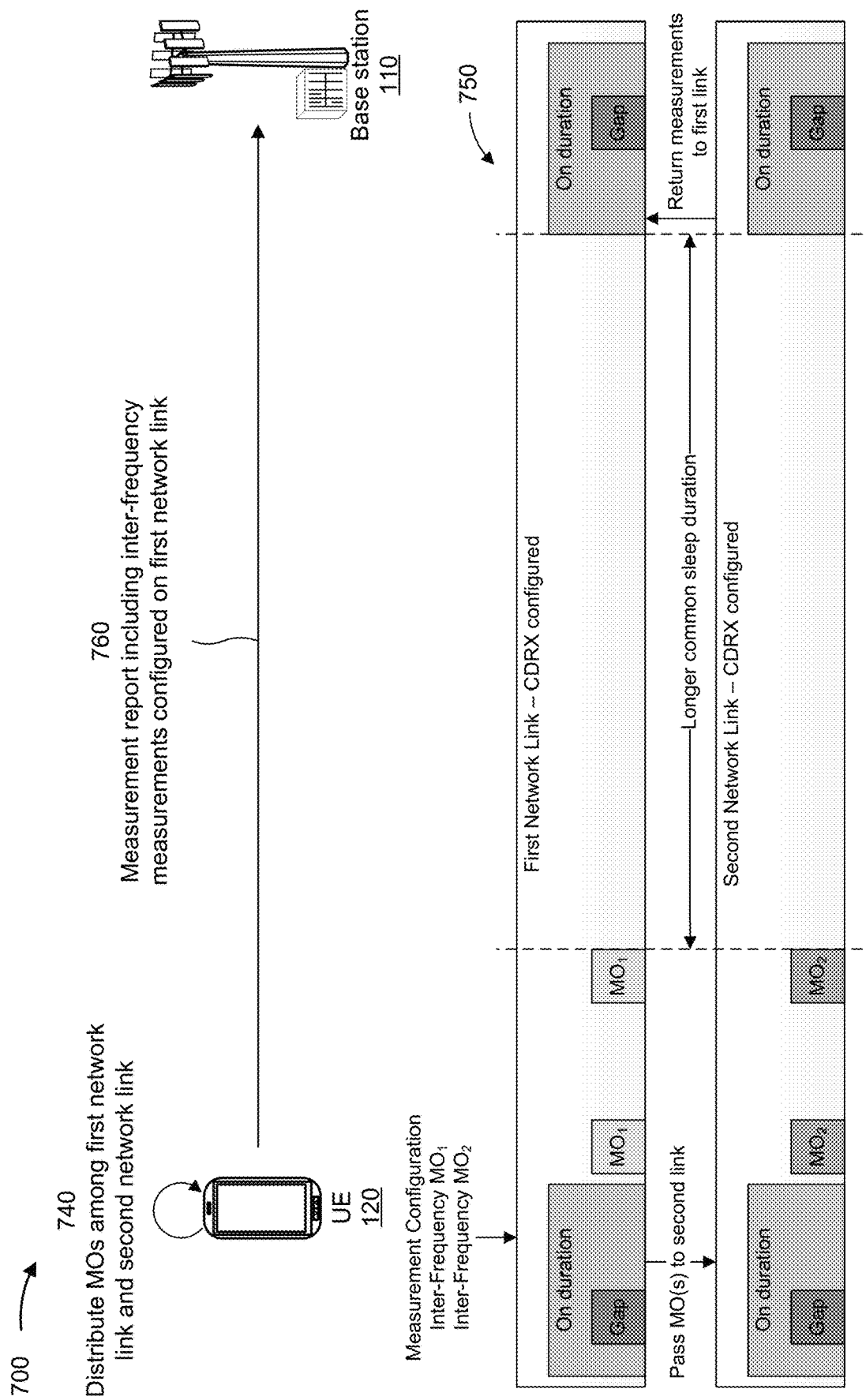

FIGS. 7A-7B are diagrams illustrating an example 700 associated with load balancing inter-frequency measurement activities for a dual network link scenario. As shown in FIGS. 7A-7B, example 700 includes communication between a base station 110 and a UE 120 in a wireless network, such as wireless network 100.

In some aspects, the UE 120 may communicate with the base station 110 via a first network link, which may include a wireless access link associated with an uplink and a downlink. Furthermore, the UE 120 may be configured to communicate with the base station 110 or another base station (not shown) via a second network link. For example, the UE 120 may be configured to communicate via the first network link and the second network link in a dual connectivity mode in which the first network link and the second network link are associated with different cell groups (e.g., as described above with reference to FIG. 3). Additionally, or alternatively, the UE 120 may be configured to communicate via the first network link using a first subscription associated with a first SIM and via the second network link using a second subscription associated with a second SIM in a multi-SIM mode (e.g., as described above with reference to FIG. 4).

In some aspects, the first network link and the second network link that are configured for the UE 120 may be managed independently from one another. For example, in the example 700 shown in FIGS. 7A-7B, the first network link is associated with a first DRX configuration (e.g., a first CDRX configuration) and the second network link is associated with a second DRX configuration (e.g., a second CDRX configuration). Furthermore, in some aspects, the first network link and the second network link may be associated with different measurement configurations. For example, as shown at 710, the base station 110 may transmit, and the UE 120 may receive, a measurement configuration that indicates one or more inter-frequency measurement objects on the first network link associated with the DRX configuration. However, as further shown in FIG. 7A, the second network link associated with the second DRX configuration has no measurement objects or very few measurement objects configured. Accordingly, as described herein, the UE 120 may be configured to load balance the inter-frequency measurement objects to increase utilization of available resources on the second network link and/or increase a time period during which reception components associated with the first network link can be operated in a low power state during the off duration of the DRX cycle configured on the first network link. Furthermore, as described herein, the inter-frequency measurement objects may be load balanced to increase a common sleep duration across the first network link and the second network link. In this way, the UE 120 may operate one or more common components that are shared by the first network link and the second network link in a sleep state during the common sleep duration.

For example, in some aspects, the UE 120 and the base station 110 may communicate on a downlink using one or more downlink carrier frequencies associated with one or more serving cells. Accordingly, the base station 110 may transmit the measurement configuration to the UE 120 to request that the UE 120 perform one or more measurement activities to manage the network link between the base station 110 and the UE 120 (e.g., to determine whether to maintain the network link via the current serving cell(s) or initiate a handover to a different carrier frequency or a different serving cell that may offer better performance than the current serving cell(s)). For example, as described herein, the measurement configuration may indicate the inter-frequency measurement objects to request that the UE 120 perform measurements at one or more frequencies that differ from any downlink carrier frequency that the UE 120 is using to communicate with the base station 110. Furthermore, in addition to indicating the inter-frequency measurement objects, the measurement configuration may include parameters that relate to a reporting configuration (e.g., one or more reporting criteria that trigger the UE 120 to transmit a measurement report and/or a reporting format), one or more measurement identities that each link a particular measurement object with a particular reporting configuration, one or more quantity configurations that define measurement quantities and associated event and/or reporting filtering for a measurement type, and/or one or more measurement gaps that define time periods that the UE 120 may use to perform the inter-frequency measurement activities (e.g., time periods when no downlink or uplink transmissions are scheduled to or from the UE 120).

As further shown in FIG. 7A, at 720, the UE 120 may determine that the inter-frequency measurement objects configured on the first network link include one or more inter-frequency measurement objects that are scheduled during the off duration of the DRX cycle configured on the first network link. For example, as shown at 730, the measurement configuration may indicate a first inter-frequency measurement object ($MO_1$) associated with one or more inter-frequency measurement activities that the UE 120 is requested to perform on a first downlink frequency that differs from any downlink carrier frequencies that the UE 120 is using to communicate with the base station 110, and a second inter-frequency measurement object ($MO_2$) associated with one or more inter-frequency measurement activities that the UE 120 is requested to perform on a second downlink frequency that differs from any of the downlink carrier frequencies that the UE 120 is using to communicate with the base station 110. In this case, as shown at 730, the measurement configuration may cause the UE 120 to open four (4) gap occasions during the off duration of the DRX cycle on the first network link, which would prevent the UE 120 from operating reception components associated with the first network link in a sleep state during the off duration of the DRX cycle if the UE 120 were to utilize the gap occasions to perform inter-frequency measurement activities.

However, because the second network link has fewer configured measurement objects than the first network link (e.g., none in the illustrated example), the second network link includes unoccupied gap occasions that the UE 120 could potentially utilize to perform inter-frequency measurement activities for some of the inter-frequency measurement objects configured on the first network link to reduce power consumption by the UE 120. For example, in a dual network link scenario, the first network link and the second network link may share one or more resources (e.g., receive chain components, transmit chain components, and/or control components, among other examples). However, the shared resource(s) can be turned off or otherwise operated in a low power state only when neither network link is using the shared resource(s). Accordingly, in cases where the first network link and the second network link are both associated with a DRX configuration and more measurement objects are configured on one of the network links (e.g., the first network link in the illustrated example), the UE 120 needs to wait a longer time to satisfy the common sleep condition that allows the shared resource(s) associated with the first network link and the second network link to be operated in a low power state. For example, the UE 120 may need to wait until all of the inter-frequency measurement activities configured on the first network link have completed before operating the shared resource(s) associated with the first network link and the second network link in the low power state during the common sleep duration.

Accordingly, as shown in FIG. 7B, at 740, the UE 120 may assign, to the second network link, a subset of the inter-frequency measurement objects that are scheduled during the off duration of the DRX cycle associated with the first network link. For example, based at least in part on the first network link and the second network link each having a DRX configuration and there being an imbalance in the number of inter-frequency measurement activities configured on the first and second network links, the UE 120 may distribute the inter-frequency measurement objects among the first network link and the second network link. For example, in some aspects, the UE 120 may include a common component associated with the first network link and the second network link (e.g., a controller, a receive processor, and/or a shared baseband component, among other examples) that may evaluate the measurement objects configured on the first network link and the second network link and distribute the measurement objects among the first network link and the second network link to maximize power savings and/or resource utilization, among other examples.

For example, as shown at 750, one or more inter-frequency measurement objects configured on the first network link may be assigned to the first network link and one or more inter-frequency measurement objects configured on the first network link may be assigned to the second network link. For example, the inter-frequency measurement object(s) assigned to the first network link and the inter-frequency measurement object(s) assigned to the second network link may be associated with different frequencies. In general, as shown, the inter-frequency measurement objects assigned to the second network link may be assigned to unoccupied gap occasions in an earlier portion of the off duration of the DRX cycle. In this way, inter-frequency measurement activities distributed across the first network link and the second network link may be performed during an overlapping time period, which may be concentrated in the earlier portion of the off duration of the DRX cycle. In this way, by distributing the inter-frequency measurement activities among the first network link and the second network link, the inter-frequency measurement activities may be completed at an earlier time than would be the case if the inter-frequency measurement activities were performed on one network link. As a result, distributing the inter-frequency measurement activities among the first network link and the second network link may increase the common sleep duration across the first network link and the second network link, which may reduce power consumption at the UE 120 by extending the time that components shared by the first network link and the second network link can be operated in a low power state.

Accordingly, the UE 120 may use reception components associated with the first network link and the second network link to perform inter-frequency measurement activities for the inter-frequency measurement objects distributed among the first network link and the second network link. After the inter-frequency measurement activities have completed, the UE 120 may operate one or more reception components associated with the first network link in accordance with the off duration of the DRX cycle (e.g., in a sleep state), may operate one or more reception components associated with the second network link in accordance with the off duration of the DRX cycle (e.g., in a sleep state), and may operate one or more shared components associated with the first network link and the second network link in accordance with the off duration of the DRX cycle (e.g., in a sleep state) during a common sleep duration (e.g., a time period during which the first network link and the second network link are both in a DRX off duration). Furthermore, as shown in FIG. 7B, any inter-frequency measurements obtained using the second network link may be returned from the second network link to the first link where the inter-frequency measurement objects were originally configured (e.g., via an internal bus or another suitable interconnect). Accordingly, as shown at 760, the UE 120 may transmit, and the base station 110 may receive, a measurement report that includes the inter-frequency measurements that were originally configured on the first network link and performed using the second network link as well as the inter-frequency measurements that were originally configured on the first network link and performed using the first network link. For example, in some aspects, the measurement report may be triggered and/or formatted based at least in part on a reporting configuration indicated in the measurement configuration provided by the base station 110, and may include one or more measurement quantities based at least in part on one or more measurement identities and/or quantity configurations indicated in the measurement configuration provided by the base station 110. In this way, the UE 120 may use the second network link to perform the inter-frequency measurements requested by the base station in order to reduce power consumption and/or improve resource utilization associated with the inter-frequency measurement activities in a manner that is generally transparent to the base station 110.

As indicated above, FIGS. 7A-7B are provided as an example. Other examples may differ from what is described with respect to FIGS. 7A-7B.

Figure 8:
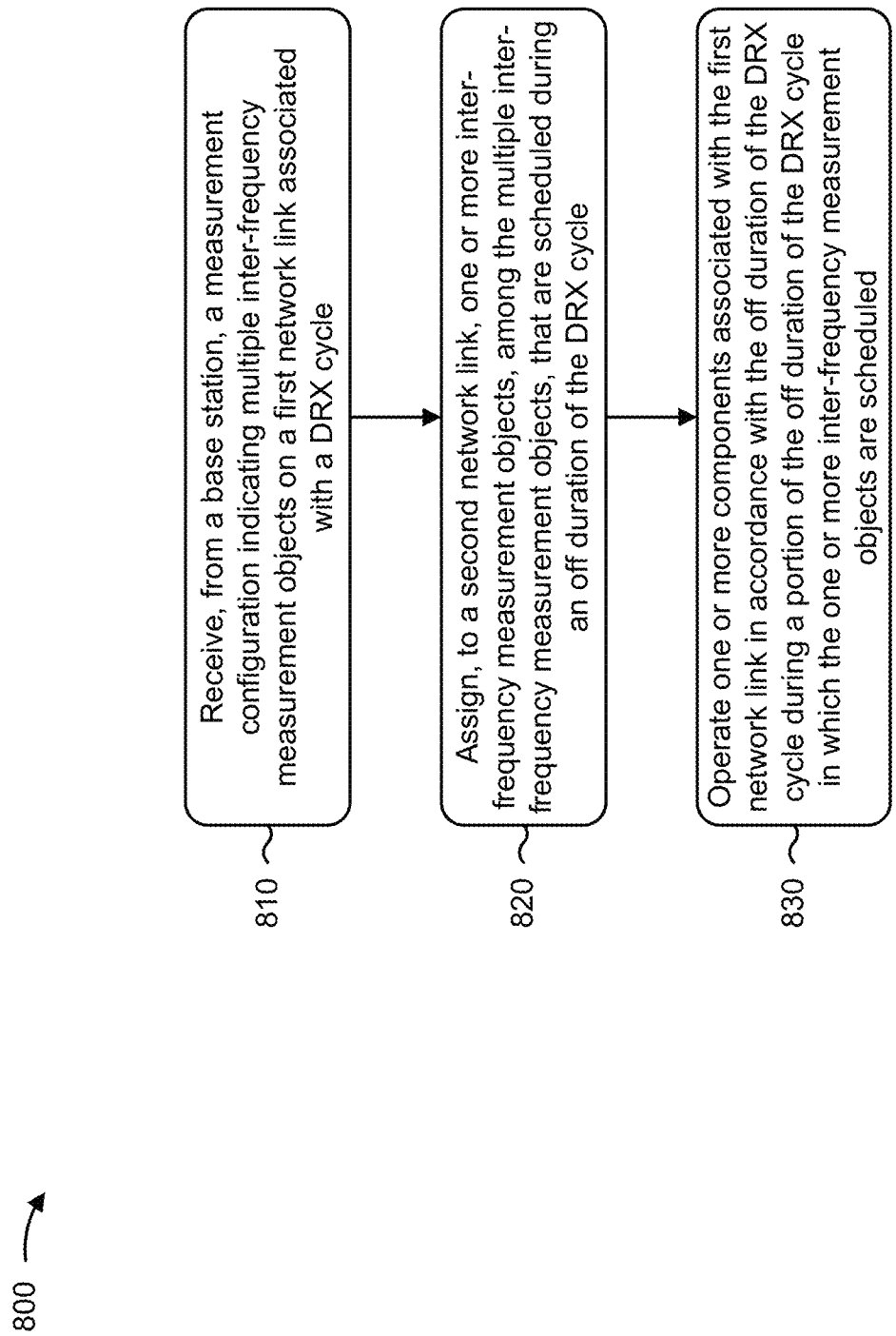
FIG. 8 is a flowchart of an example method of wireless communication.

FIG. 8 is a flowchart of an example method 800 of wireless communication. The method 800 may be performed by, for example, a UE (e.g., UE 120) configured to communicate using a first network link and a second network link. In some aspects, the first network link and the second network link are associated with different cell groups configured in a dual connectivity mode. In some aspects, the first network link and the second network link are associated with different SIMs.

At 810, the UE may receive, from a base station, a measurement configuration indicating multiple inter-frequency measurement objects on the first network link associated with a DRX cycle. For example, the UE (e.g., using reception component 902, depicted in FIG. 9) may receive, from a base station, a measurement configuration indicating multiple inter-frequency measurement objects on the first network link associated with a DRX cycle, as described above in connection with, for example, FIG. 6A at 610 and FIG. 7A at 710.

At 820, the UE may assign, to the second network link, one or more inter-frequency measurement objects, among the multiple inter-frequency measurement objects, that are scheduled during an off duration of the DRX cycle. For example, the UE (e.g., using assignment component 908, depicted in FIG. 9) may assign, to the second network link, one or more inter-frequency measurement objects, among the multiple inter-frequency measurement objects, that are scheduled during an off duration of the DRX cycle, as described above in connection with, for example, FIG. 6B at 640 and FIG. 7B at 740. In some aspects, the one or more inter-frequency measurement objects assigned to the second network link include all of the inter-frequency measurement objects that are scheduled during the off duration of the DRX cycle based at least in part on the second network link having an always-on configuration. In some aspects, the one or more inter-frequency measurement objects assigned to the second network link are associated with one or more frequencies that are different from one or more frequencies associated with one or more inter-frequency measurement objects assigned to the first network link. In some aspects, the one or more inter-frequency measurement objects are assigned to unoccupied gap occasions on the second network link.

At 830, the UE may operate one or more components associated with the first network link in accordance with the off duration of the DRX cycle during a portion of the off duration of the DRX cycle in which the one or more inter-frequency measurement objects are scheduled. For example, the UE (e.g., using operation component 910, depicted in FIG. 9) may operate one or more components associated with the first network link in accordance with the off duration of the DRX cycle during a portion of the off duration of the DRX cycle in which the one or more inter-frequency measurement objects are scheduled, as described above in connection with, for example, FIG. 6B at 650 and FIG. 7B at 750. In some aspects, the one or more components associated with the first network link operate in accordance with the off duration of the DRX cycle during an entirety of the off duration of the DRX cycle based at least in part on all of the inter-frequency measurement objects scheduled during the off duration of the DRX cycle being assigned to the second network link. In some aspects, the portion of the off duration of the DRX cycle in which the one or more inter-frequency measurement objects are scheduled overlaps with an off duration of a DRX cycle associated with the second network link. In some aspects, method 800 includes operating one or more common components that are shared by the first network link and the second network link in accordance with the off duration of the DRX cycle during the portion of the off duration of the DRX cycle associated with the first network link that overlaps with the off duration of the DRX cycle associated with the second network link, as described above in connection with, for example, FIG. 6B at 650 and FIG. 7B at 750.

In some aspects, method 800 includes performing, using one or more components associated with the second network link, one or more inter-frequency measurement activities for the one or more inter-frequency measurement objects assigned to the second network link, and transmitting, to the base station via the first network link, a measurement report including one or more inter-frequency measurements that are based at least in part on the one or more inter-frequency measurement activities performed using the one or more components associated with the second network link, as described above in connection with, for example, FIG. 6B at 650 and 660 and FIG. 7B at 750 and 760.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
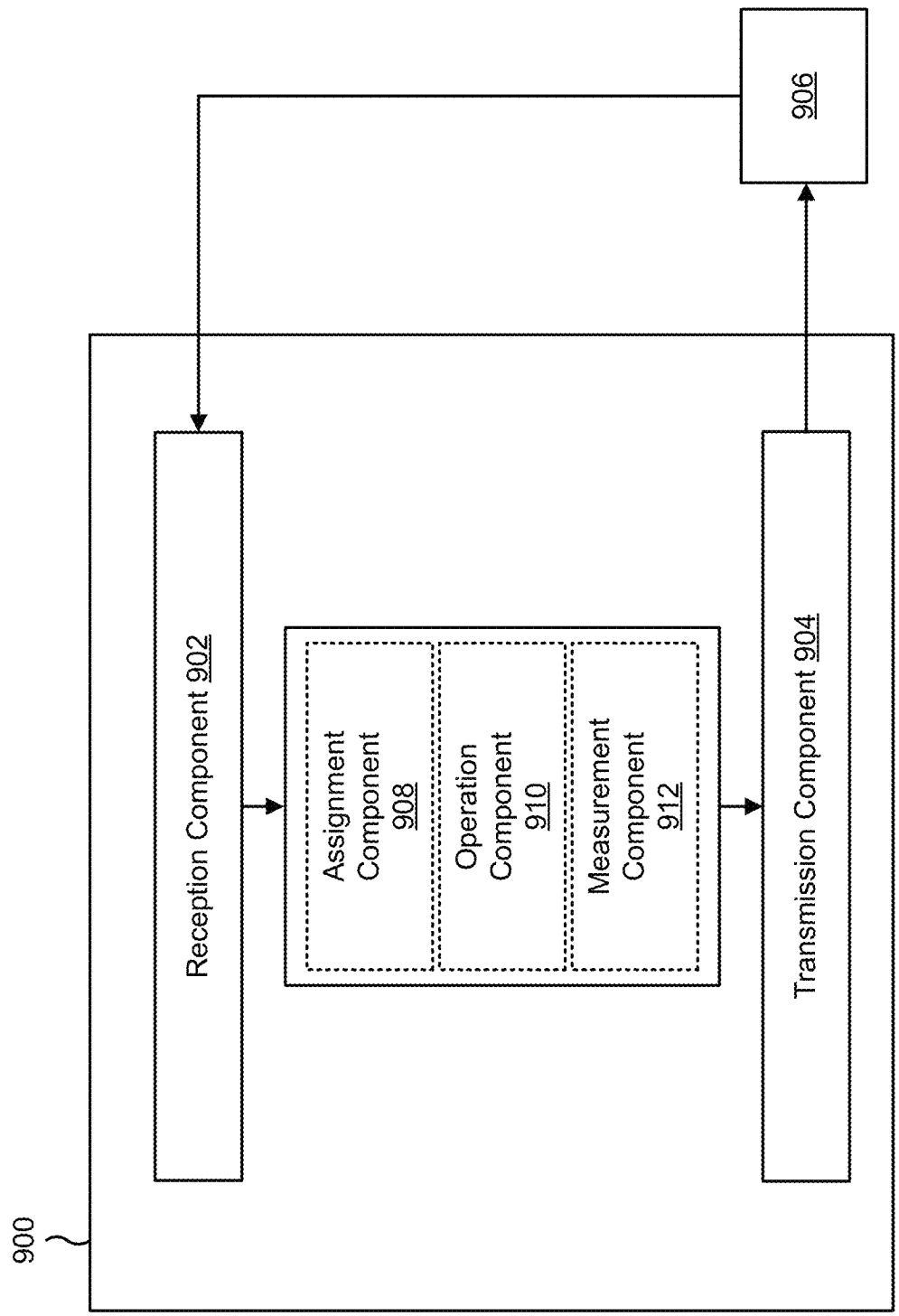
FIG. 9 is a block diagram of an example apparatus for wireless communication.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of an assignment component 908, an operation component 910, or a measurement component 912, among other examples.

In some aspects, the apparatus 900 may be configured to perform one or more operations described herein in connection with FIGS. 6A-6B and/or FIGS. 7A-7B. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, a measurement configuration indicating multiple inter-frequency measurement objects on a first network link associated with a DRX cycle. The assignment component 908 may assign, to a second network link, one or more inter-frequency measurement objects, among the multiple inter-frequency measurement objects, that are scheduled during an off duration of the DRX cycle. The operation component 910 may operate one or more components associated with the first network link in accordance with the off duration of the DRX cycle during a portion of the off duration of the DRX cycle in which the one or more inter-frequency measurement objects are scheduled.

The operation component 910 may operate one or more common components that are shared by the first network link and the second network link in accordance with the off duration of the DRX cycle during the portion of the off duration of the DRX cycle associated with the first network link that overlaps with the off duration of the DRX cycle associated with the second network link.

The measurement component 912 may perform, using one or more components associated with the second network link, one or more inter-frequency measurement activities for the one or more inter-frequency measurement objects assigned to the second network link. The transmission component 904 may transmit, to the base station via the first network link, a measurement report including one or more inter-frequency measurements that are based at least in part on the one or more inter-frequency measurement activities performed using the one or more components associated with the second network link.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
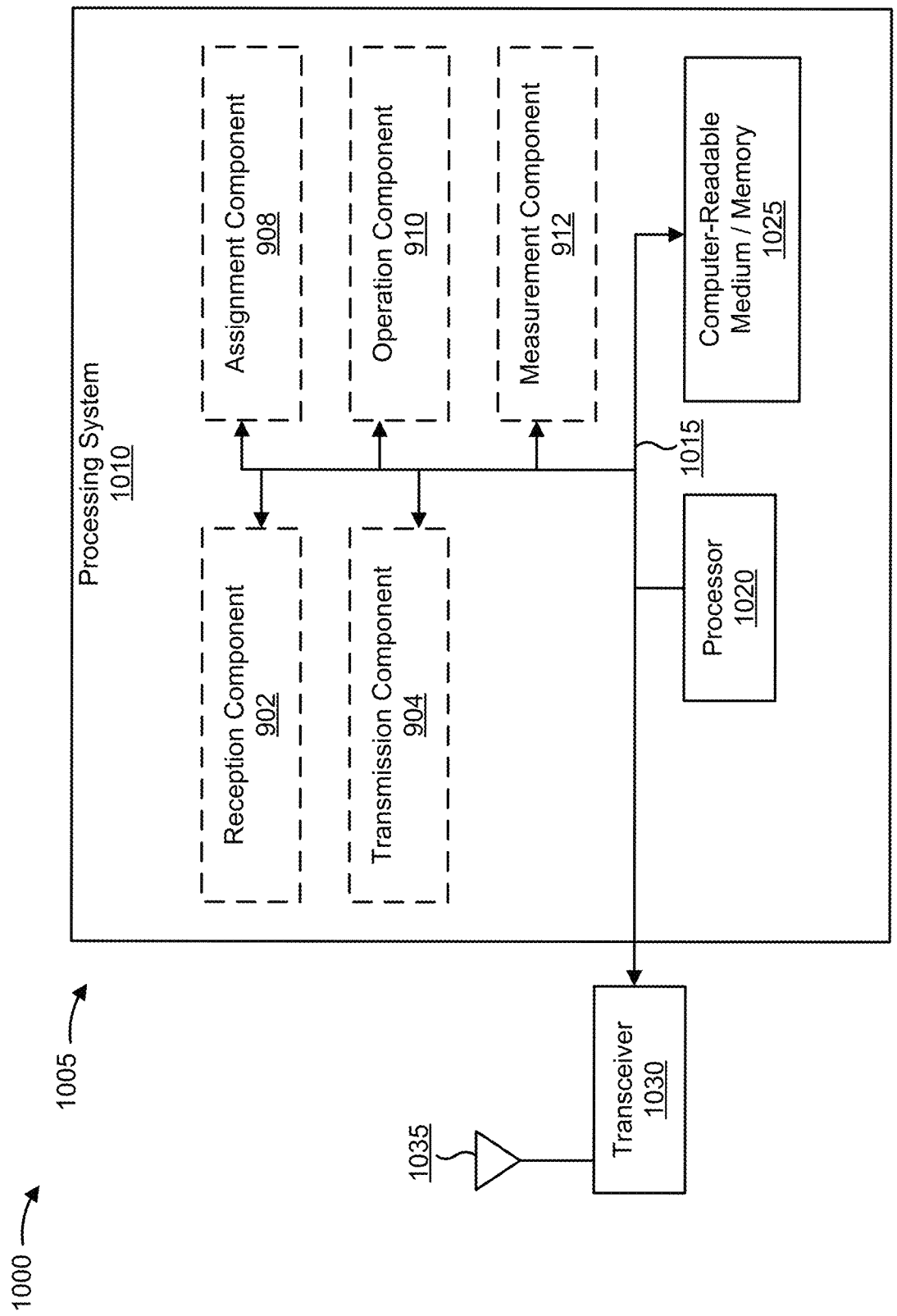
FIG. 10 is a diagram illustrating an example of a hardware implementation for an apparatus employing a processing system.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for receiving, from a base station, a measurement configuration indicating multiple inter-frequency measurement objects on a first network link associated with a DRX cycle, means for assigning, to a second network link, one or more inter-frequency measurement objects, among the multiple inter-frequency measurement objects, that are scheduled during an off duration of the DRX cycle, and/or means for operating one or more components associated with the first network link in accordance with the off duration of the DRX cycle during a portion of the off duration of the DRX cycle in which the one or more inter-frequency measurement objects are scheduled. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

The following provides an overview of aspects of the present disclosure:

Aspect 1: A method of wireless communication performed by a UE, comprising: receiving, from a base station, a measurement configuration indicating multiple inter-frequency measurement objects on a first network link associated with a DRX cycle; assigning, to a second network link, one or more inter-frequency measurement objects, among the multiple inter-frequency measurement objects, that are scheduled during an off duration of the DRX cycle; and operating one or more components associated with the first network link in accordance with the off duration of the DRX cycle during a portion of the off duration of the DRX cycle in which the one or more inter-frequency measurement objects are scheduled.

Aspect 2: The method of aspect 1, wherein the one or more inter-frequency measurement objects assigned to the second network link include all of the inter-frequency measurement objects that are scheduled during the off duration of the DRX cycle based at least in part on the second network link having an always-on configuration.

Aspect 3: The method of aspect 2, wherein the one or more components associated with the first network link operate in accordance with the off duration of the DRX cycle during an entirety of the off duration of the DRX cycle based at least in part on all of the inter-frequency measurement objects scheduled during the off duration of the DRX cycle being assigned to the second network link.

Aspect 4: The method of aspect 1, wherein the portion of the off duration of the DRX cycle in which the one or more inter-frequency measurement objects are scheduled overlaps with an off duration of a DRX cycle associated with the second network link.

Aspect 5: The method of aspect 4, further comprising: operating one or more common components that are shared by the first network link and the second network link in accordance with the off duration of the DRX cycle during the portion of the off duration of the DRX cycle associated with the first network link that overlaps with the off duration of the DRX cycle associated with the second network link.

Aspect 6: The method of any of aspects 4-5, wherein the one or more inter-frequency measurement objects assigned to the second network link are associated with one or more frequencies that are different from one or more frequencies associated with one or more inter-frequency measurement objects assigned to the first network link.

Aspect 7: The method of any of aspects 1-6, wherein the one or more inter-frequency measurement objects are assigned to unoccupied gap occasions on the second network link.

Aspect 8: The method of any of aspects 1-7, further comprising: performing, using one or more components associated with the second network link, one or more inter-frequency measurement activities for the one or more inter-frequency measurement objects assigned to the second network link; and transmitting, to the base station via the first network link, a measurement report including one or more inter-frequency measurements that are based at least in part on the one or more inter-frequency measurement activities performed using the one or more components associated with the second network link.

Aspect 9: The method of any of aspects 1-8, wherein the first network link and the second network link are associated with different cell groups configured in a dual connectivity mode.

Aspect 10: The method of any of aspects 1-9, wherein the first network link and the second network link are associated with different subscriber identity modules.

Aspect 11: An apparatus for wireless communication at a device, comprising a processor; memory coupled with the processor; and instructions stored in the memory and executable by the processor to cause the apparatus to perform the method of any of aspects 1-10.

Aspect 12: A device for wireless communication, comprising a memory and one or more processors coupled to the memory, the memory and the one or more processors configured to perform the method of any of aspects 1-10.

Aspect 13: An apparatus for wireless communication, comprising at least one means for performing the method of any of aspects 1-10.

Aspect 14: A non-transitory computer-readable medium storing code for wireless communication, the code comprising instructions executable by a processor to perform the method of any of aspects 1-10.

Aspect 15: A non-transitory computer-readable medium storing a set of instructions for wireless communication, the set of instructions comprising one or more instructions that, when executed by one or more processors of a device, cause the device to perform the method of any of aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network entity, a measurement configuration indicating multiple inter-frequency measurement objects on a first network link associated with a discontinuous reception (DRX) cycle;
   assigning, to a second network link, one or more inter-frequency measurement objects, among the multiple inter-frequency measurement objects, that are scheduled during an off duration of the DRX cycle,
      wherein the one or more inter-frequency measurement objects assigned to the second network link include all of the inter-frequency measurement objects that are scheduled during the off duration of the DRX cycle based at least in part on the second network link having an always-on configuration; and
   operating, based at least in part on all of the inter-frequency measurement objects scheduled during the off duration of the DRX cycle being assigned to the second network link, one or more components associated with the first network link in accordance with the off duration of the DRX cycle during an entirety of the off duration of the DRX cycle in which the one or more inter-frequency measurement objects are scheduled.

2. The method of claim 1, wherein a portion of another off duration of the DRX cycle in which one or more other inter-frequency measurement objects are scheduled overlaps with an off duration of a DRX cycle associated with the second network link.

3. The method of claim 2, further comprising:
   operating one or more common components that are shared by the first network link and the second network link in accordance with the off duration of the DRX cycle during the portion of the off duration of the DRX cycle associated with the first network link that overlaps with the off duration of the DRX cycle associated with the second network link.

4. The method of claim 2, wherein the one or more other inter-frequency measurement objects are assigned to the second network link and are associated with one or more frequencies that are different from one or more frequencies associated with one or more inter-frequency measurement objects assigned to the first network link.

5. The method of claim 1, wherein the one or more inter-frequency measurement objects are assigned to unoccupied gap occasions on the second network link.

6. The method of claim 1, further comprising:
   performing, using one or more components associated with the second network link, one or more inter-frequency measurement activities for the one or more inter-frequency measurement objects assigned to the second network link; and
   transmitting, to the network entity via the first network link, a measurement report including one or more inter-frequency measurements that are based at least in part on the one or more inter-frequency measurement activities performed using the one or more components associated with the second network link.

7. The method of claim 1, wherein the first network link and the second network link are associated with different cell groups configured in a dual connectivity mode.

8. The method of claim 1, wherein the first network link and the second network link are associated with different subscriber identity modules.

9. A user equipment (UE) for wireless communication, comprising:
a memory; and
one or more processors coupled to the memory and configured to:
receive, from a network entity, a measurement configuration indicating multiple inter-frequency measurement objects on a first network link associated with a discontinuous reception (DRX) cycle;
assign, to a second network link, one or more inter-frequency measurement objects, among the multiple inter-frequency measurement objects, that are scheduled during an off duration of the DRX cycle,
wherein the one or more inter-frequency measurement objects assigned to the second network link include all of the inter-frequency measurement objects that are scheduled during the off duration of the DRX cycle based at least in part on the second network link having an always-on configuration; and
operate, based at least in part on all of the inter-frequency measurement objects scheduled during the off duration of the DRX cycle being assigned to the second network link, one or more components associated with the first network link in accordance with the off duration of the DRX cycle during an entirety of the off duration of the DRX cycle in which the one or more inter-frequency measurement objects are scheduled.

10. The UE of claim 9, wherein a portion of another off duration of the DRX cycle in which one or more other inter-frequency measurement objects are scheduled overlaps with an off duration of a DRX cycle associated with the second network link.

11. The UE of claim 10, wherein the one or more processors are further configured to:
operate one or more common components that are shared by the first network link and the second network link in accordance with the off duration of the DRX cycle during the portion of the off duration of the DRX cycle associated with the first network link that overlaps with the off duration of the DRX cycle associated with the second network link.

12. The UE of claim 10, wherein the one or more other inter-frequency measurement objects are assigned to the second network link and are associated with one or more frequencies that are different from one or more frequencies associated with one or more inter-frequency measurement objects assigned to the first network link.

13. The UE of claim 9, wherein the one or more inter-frequency measurement objects are assigned to unoccupied gap occasions on the second network link.

14. The UE of claim 9, wherein the one or more processors are further configured to:
perform, using one or more components associated with the second network link, one or more inter-frequency measurement activities for the one or more inter-frequency measurement objects assigned to the second network link; and
transmit, to the network entity via the first network link, a measurement report including one or more inter-frequency measurements that are based at least in part on the one or more inter-frequency measurement activities performed using the one or more components associated with the second network link.

15. The UE of claim 9, wherein the first network link and the second network link are associated with different cell groups configured in a dual connectivity mode.

16. The UE of claim 9, wherein the first network link and the second network link are associated with different subscriber identity modules.

17. A non-transitory computer-readable medium storing a set of instructions for wireless communication, the set of instructions comprising:
one or more instructions that, when executed by one or more processors of a user equipment (UE), cause the UE to:
receive, from a network entity, a measurement configuration indicating multiple inter-frequency measurement objects on a first network link associated with a discontinuous reception (DRX) cycle;
assign, to a second network link, one or more inter-frequency measurement objects, among the multiple inter-frequency measurement objects, that are scheduled during an off duration of the DRX cycle,
wherein the one or more inter-frequency measurement objects assigned to the second network link include all of the inter-frequency measurement objects that are scheduled during the off duration of the DRX cycle based at least in part on the second network link having an always-on configuration; and
operate one or more components associated with the first network link in accordance with the off duration of the DRX cycle during an entirety of the off duration of the DRX cycle in which the one or more inter-frequency measurement objects are scheduled.

18. The non-transitory computer-readable medium of claim 17, wherein a portion of another off duration of the DRX cycle in which one or more other inter-frequency measurement objects are scheduled overlaps with an off duration of a DRX cycle associated with the second network link.

19. The non-transitory computer-readable medium of claim 18, wherein the one or more instructions further cause the UE to:
operate one or more common components that are shared by the first network link and the second network link in accordance with the off duration of the DRX cycle during the portion of the off duration of the DRX cycle associated with the first network link that overlaps with the off duration of the DRX cycle associated with the second network link.

20. The non-transitory computer-readable medium of claim 18, wherein the one or more other inter-frequency measurement objects are assigned to the second network link and are associated with one or more frequencies that are different from one or more frequencies associated with one or more inter-frequency measurement objects assigned to the first network link.

21. The non-transitory computer-readable medium of claim 17, wherein the one or more inter-frequency measurement objects are assigned to unoccupied gap occasions on the second network link.

22. An apparatus for wireless communication, comprising:
means for receiving, from a network entity, a measurement configuration indicating multiple inter-frequency measurement objects on a first network link associated with a discontinuous reception (DRX) cycle;
means for assigning, to a second network link, one or more inter-frequency measurement objects, among the multiple inter-frequency measurement objects, that are scheduled during an off duration of the DRX cycle, wherein the one or more inter-frequency measurement objects assigned to the second network link include all of the inter-frequency measurement objects that are scheduled during the off duration of the DRX cycle based at least in part on the second network link having an always-on configuration; and means for operating, based at least in part on all of the inter-frequency measurement objects scheduled during the off duration of the DRX cycle being assigned to the second network link, one or more components associated with the first network link in accordance with the off duration of the DRX cycle during an entirety of the off duration of the DRX cycle in which the one or more inter-frequency measurement objects are scheduled.

23. The apparatus of claim 22, wherein a portion of another off duration of the DRX cycle in which one or more other inter-frequency measurement objects are scheduled overlaps with an off duration of a DRX cycle associated with the second network link.

24. The apparatus of claim 23, further comprising:
means for operating one or more common components that are shared by the first network link and the second network link in accordance with the off duration of the DRX cycle during the portion of the off duration of the DRX cycle associated with the first network link that overlaps with the off duration of the DRX cycle associated with the second network link.

25. The apparatus of claim 23, wherein the one or more other inter-frequency measurement objects are assigned to the second network link and are associated with one or more frequencies that are different from one or more frequencies associated with one or more inter-frequency measurement objects assigned to the first network link.

26. The apparatus of claim 22, wherein the one or more inter-frequency measurement objects are assigned to unoccupied gap occasions on the second network link.

27. The apparatus of claim 22, further comprising:
means for performing, using one or more components associated with the second network link, one or more inter-frequency measurement activities for the one or more inter-frequency measurement objects assigned to the second network link; and means for transmitting, to the network entity via the first network link, a measurement report including one or more inter-frequency measurements that are based at least in part on the one or more inter-frequency measurement activities performed using the one or more components associated with the second network link.

28. The apparatus of claim 22, wherein the first network link and the second network link are associated with different cell groups configured in a dual connectivity mode.

29. The apparatus of claim 22, wherein the first network link and the second network link are associated with different subscriber identity modules.

* * * * *